United States Patent [19]

Porter

[11] 4,156,465
[45] May 29, 1979

[54] HARVESTING MACHINE WITH SELF-CLEANING CONVEYOR CHAINS

[76] Inventor: Wellington W. Porter, Box 90 Dublin Rd., R.D. 2, Waterloo, N.Y. 13165

[21] Appl. No.: 821,790

[22] Filed: Aug. 4, 1977

[51] Int. Cl.² .............................................. A01D 17/04
[52] U.S. Cl. ...................................... 171/14; 198/484; 56/327 R
[58] Field of Search .............. 130/30 R, 30 J; 171/14, 171/27; 198/494, 496, 804, 806, 813–816; 56/327 R

[56] References Cited

U.S. PATENT DOCUMENTS

| 3,199,604 | 8/1965 | Lorenzen et al. | 171/27 |
| 3,206,011 | 9/1965 | Hill et al. | 198/494 |
| 3,215,293 | 11/1965 | Kelly et al. | 56/328 R X |
| 3,525,167 | 8/1970 | French et al. | 37/8 |
| 3,530,651 | 9/1970 | Rounsville | 56/330 X |
| 3,633,677 | 1/1972 | Walker | 171/27 |
| 3,810,512 | 5/1974 | Porter | 171/14 |

Primary Examiner—Russell R. Kinsey
Attorney, Agent, or Firm—Charles S. McGuire

[57] ABSTRACT

A crop harvesting machine for tomatoes, or the like, which lifts plants and fruit from ground level for transport upon one or more endless conveyors having spaced, parallel links. The invention resides in a system for keeping the conveyor links free from rocks, chunks of dirt, mud, and other foreign matter. The basic element is a cleanout device which is rotatably mounted adjacent one or more of the conveyors and has radially disposed members which extend through the spaces between the links as the chain is advanced and the device is rotated. An oscillating arm may also be provided in conjunction with one or more of the conveyors to impart a shaking movement, thereby aiding in dislodging foreign material from the space between the links.

4 Claims, 11 Drawing Figures

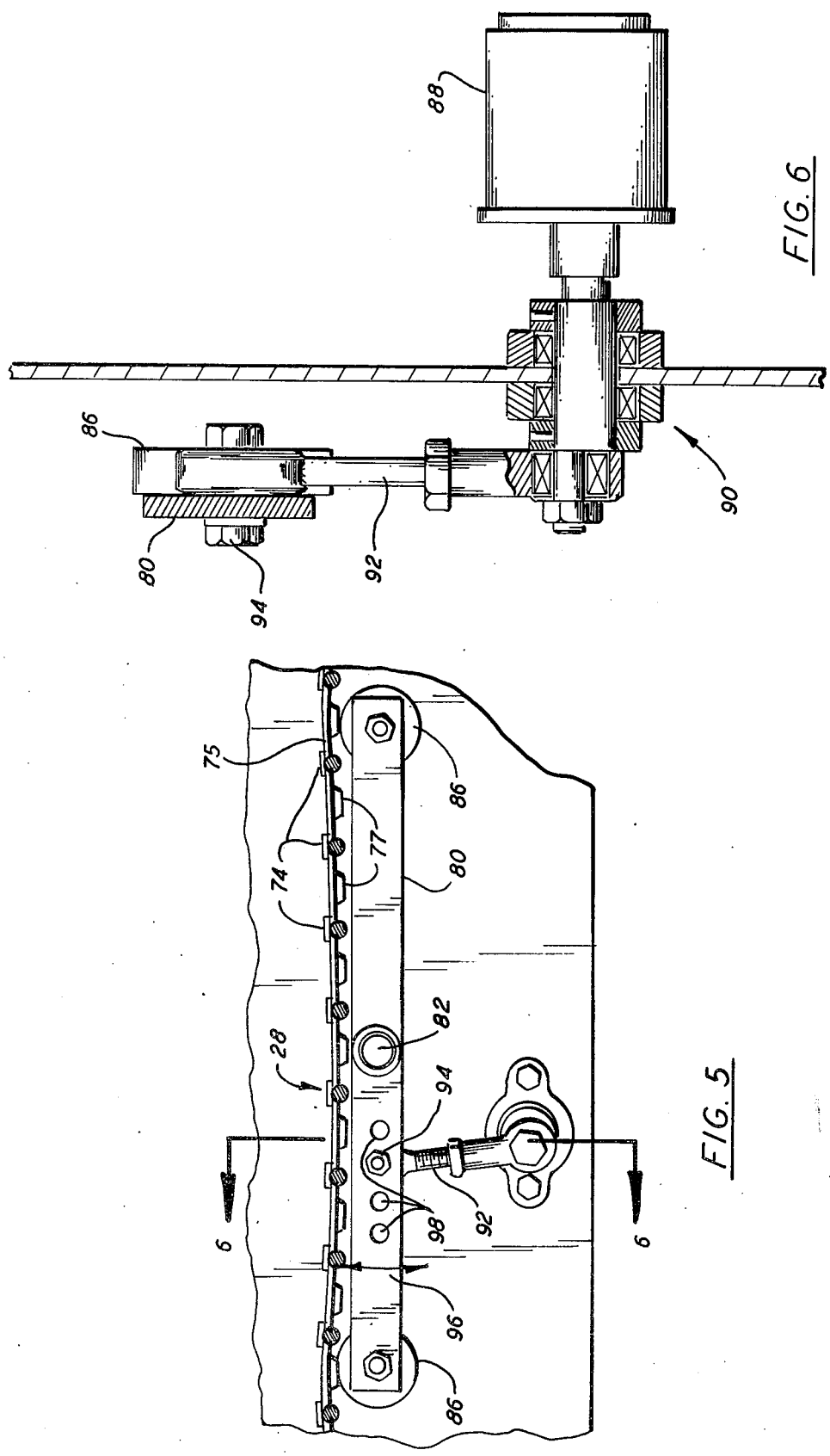

HARVESTING MACHINE WITH SELF-CLEANING CONVEYOR CHAINS

BACKGROUND OF THE INVENTION

The present invention relates to harvesting machinery and, more specifically, to apparatus for cleaning mud, dirt, rocks and other foreign material from between spaced links of harvesting machinery conveyors.

Applicant's prior U.S. Pat. Nos. 3,810,512 and 3,999,613 disclose a machine for harvesting tomatoes, or similar crops, by removing the plants and fruit from the ground, shaking the vines to remove the fruit, and transporting the crop to a final discharge conveyor. A number of conveyors, each comprising spaced, parallel rods or links joined at their ends to endless belts having spaced lugs or cleats on one side, are employed for transporting the materials through the harvesting machine. A substantial amount of dirt, rocks and other foreign materials are lifted from ground level and delivered to the machine together with the plants and fruit. Thus, there is a substantial possibility that rocks or chunks of dirt, as well as small or damaged fruit may become lodged in the spaces between the links of the conveyors. Also, when operating in wet ground, the links may quickly become clogged with mud. Since efficient operation is dependent to a large extent on allowing foreign material to separate from the crop by dropping through the spaces between the links it is most desirable that the conveyors be kept as clean as possible.

Accordingly, it is a principal object of the present invention to provide a harvesting machine of this character with a system for aiding in maintaining open-link conveyors free of foreign materials.

A further object is to provide a cleanout device for automatic operation in conjunction with an open link conveyor of a harvesting machine to remove foreign matter by means of members which pass through the spaces between the links as the conveyor is advanced.

Another object is to provide a cleaning system for a plurality of endless conveyors of a harvesting machine by a combination of oscillatory shaking of the upper run and members passing between the links of the lower run of the conveyors as they are advanced.

Other objects will in part be obvious and will in part appear hereinafter.

SUMMARY OF THE INVENTION

In accordance with the foregoing objects, the cleaning system of the invention is employed in a harvesting machine for tomatoes, or the like, which includes a plurality of endless conveyors having spaced, parallel links. The cleaning system includes one or more elements mounted in proximity to the conveyor of the harvesting machine, which may be otherwise conventional, such as that shown and described in aforementioned U.S. Pat. Nos. 3,810,512 and 3,999,613.

A basic element of the system is a cleanout device mounted for rotation about a central axis and having members extending parallel to the axis and arranged in planes extending radially therefrom. In the disclosed embodiment, the members are in the form of elongated rods parallel to the central axis and fixedly supported at equal distances therefrom. The device is mounted adjacent the lower reach of the associated conveyor with its central axis parallel to the conveyor links. The dimensions and positioning of the device are such that the elongated rods successively pass through the spaces between the conveyor links as the conveyor is advanced. The length of the rods is a substantial portion of the width of the conveyor, whereby any materials which may be lodged in the space between successive links will be pushed out by the rod of the cleanout device.

A second element for operation in conjunction with a conveyor having an associated one of the aforementioned cleanout devices in an elongated arm rotatably mounted at its center and carrying at each end a roller. Preferably, two such arms are provided, mounted for rotation about a common axis and adjacent the endless belts at each side of the conveyor, longitudinally thereof, for contact of the rollers with the lower side of the upper run of the belts. Means are provided for imparting an oscillatory movement to the arms about their centers for alternate contact and lifting of the upper run by the rollers, thereby effecting a shaking action, tending to dislodge or loosen materials lodged in the links.

The cleanout system is advantageously employed in combination with several conveyor belts of the harvesting machine, as will become apparent from the following detailed description, taken in connection with the accompanying drawings.

BRIEF DESCRIPTION OF THE DRAWINGS

FIG. 4 is an enlarged, fragmentary, side elevational view, in section on the line 4—4 of FIG. 1, showing a first cleanout device of the system;

FIGS. 4A and 4B are perspective views of alternate constructions of the cleanout device shown in FIG. 4;

FIG. 5 is an enlarged, fragmentary, side elevational view, in section on the line 5—5 of FIG. 1, showing a second element of the cleaning system;

FIG. 6 is an elevational view in section on the line 6—6 of FIG. 5; and

DETAILED DESCRIPTION

Figure 1:
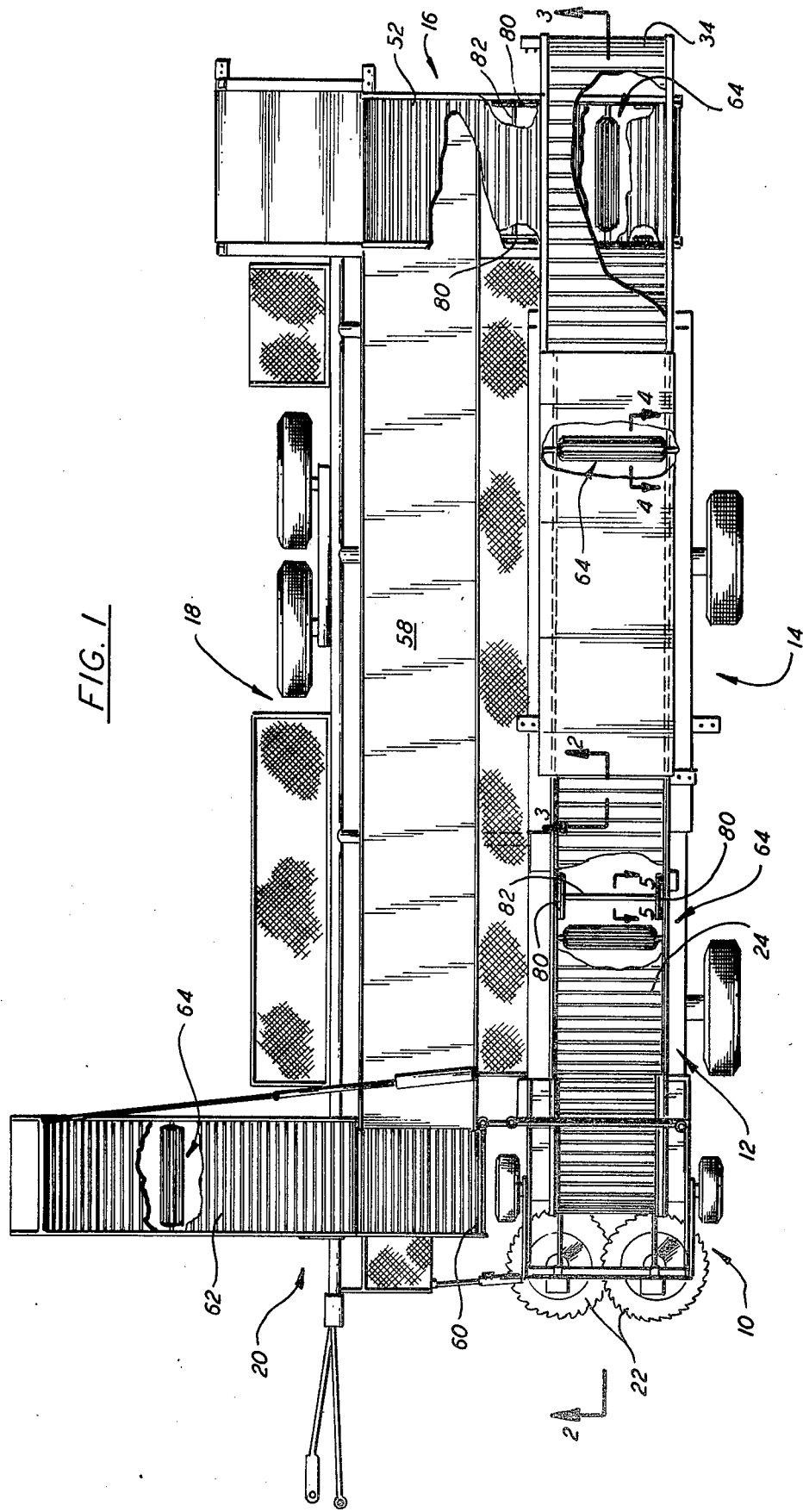
FIG. 1 is a plan view of a tomato harvester incorporating the conveyor cleaning system of the present invention, with portions broken away for a clearer showing of the various elements of the cleaning system.

The harvester shown in FIG. 1 is adapted to be pulled by a tractor and various belts, shafts and other operating parts of the harvester are driven by hydraulic motors which receive pressurized fluid from pumps powered by the tractor power-take-off unit in conventional fashion. The harvester is generally comprised of header section 10, feeder section 12, shaker section 14, rear lateral conveyor section 16, sorting section 18 and discharge section 20. Details of construction and operation of all elements of the harvester, excepting those of the present invention, may be found in aforementioned U.S. Pat. No. 3,810,512. A pair of overlapping discs 22 are mounted on header section 10 with their forward edges working slightly below ground level and counter-rotated to lift and move rearwardly a bed of soil, plants and fruit. The plant stems are severed by the action of the discs, preferably of the type disclosed in U.S. Pat. No. 3,999,613 of the present inventor.

The plants with fruit attached and loose fruit are discharged from the rear edges of discs 22 onto the lower, forward end of endless conveyor 24, together with any dirt, rocks and other foreign materials which may be picked up along with the crop. Conveyor 24 is of so-called cogged belt type, being made up of parallel links or rods connected at their ends, in substantially evenly spaced relation, to a pair of endless belts having spaced lugs or cogs along one side for engagement by the teeth of the drive sprocket.

Figure 2:
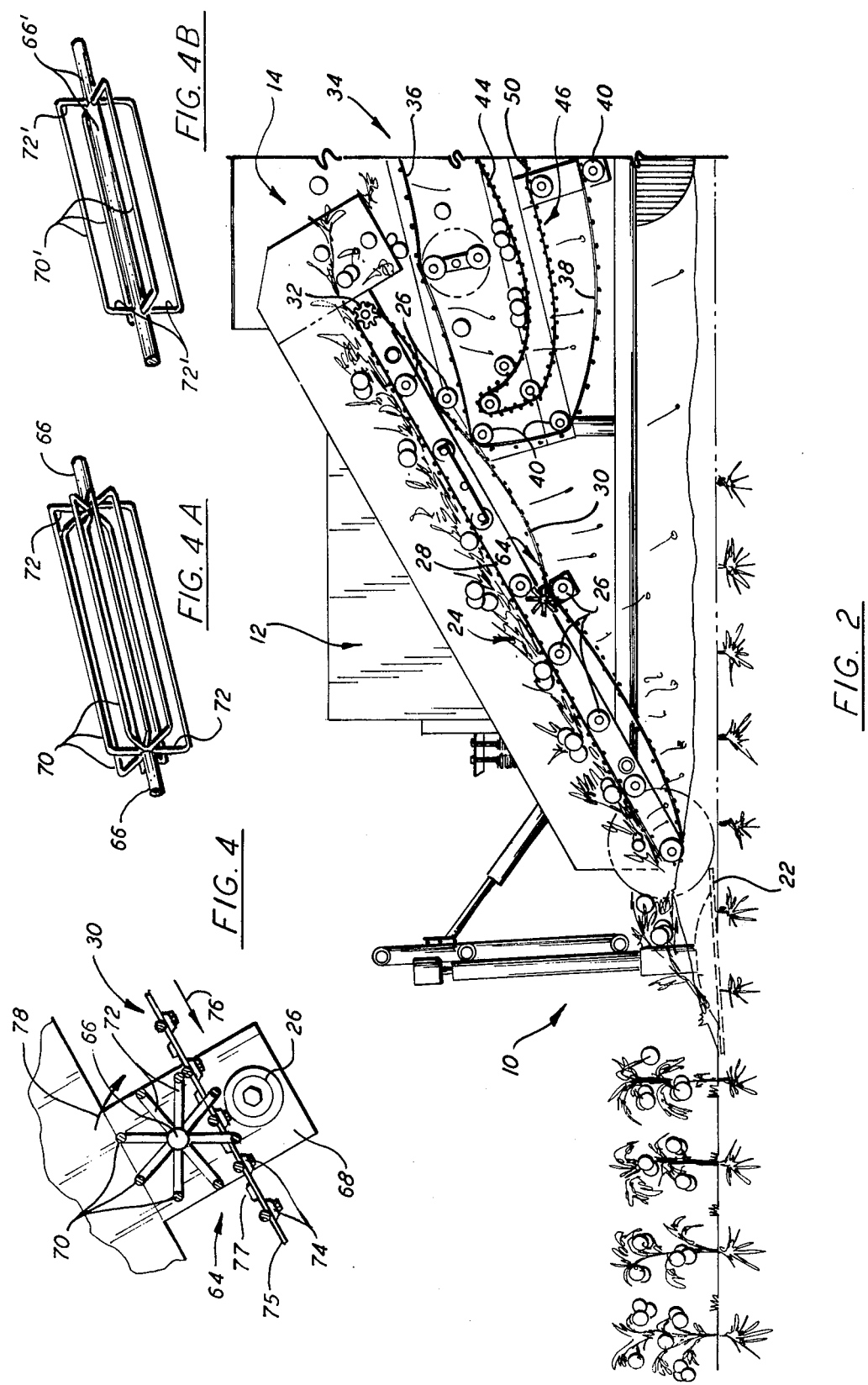
FIG. 2 is a fragmentary side elevational view of the forward portion of the harvester of FIG. 1, taken in section generally on the line 2—2 of FIG. 1.

As seen in FIG. 2, conveyor 24 is supported by rollers 26 for movement in a path establishing upper and lower runs 28 and 30, respectively. Drive sprocket 32 is connected to one of the aforementioned hydraulic motors to move conveyor 24 in a clockwise direction as shown in FIG. 2. Materials transported upon upper run 28 of conveyor 24 are discharged into shaker section 14, upon endless conveyor 34 thereof which is generally divided into upper and lower runs 36 and 38, respectively, by rollers 40 and drive sprocket 41 which establish the path of movement of conveyor 34.

Figure 3:
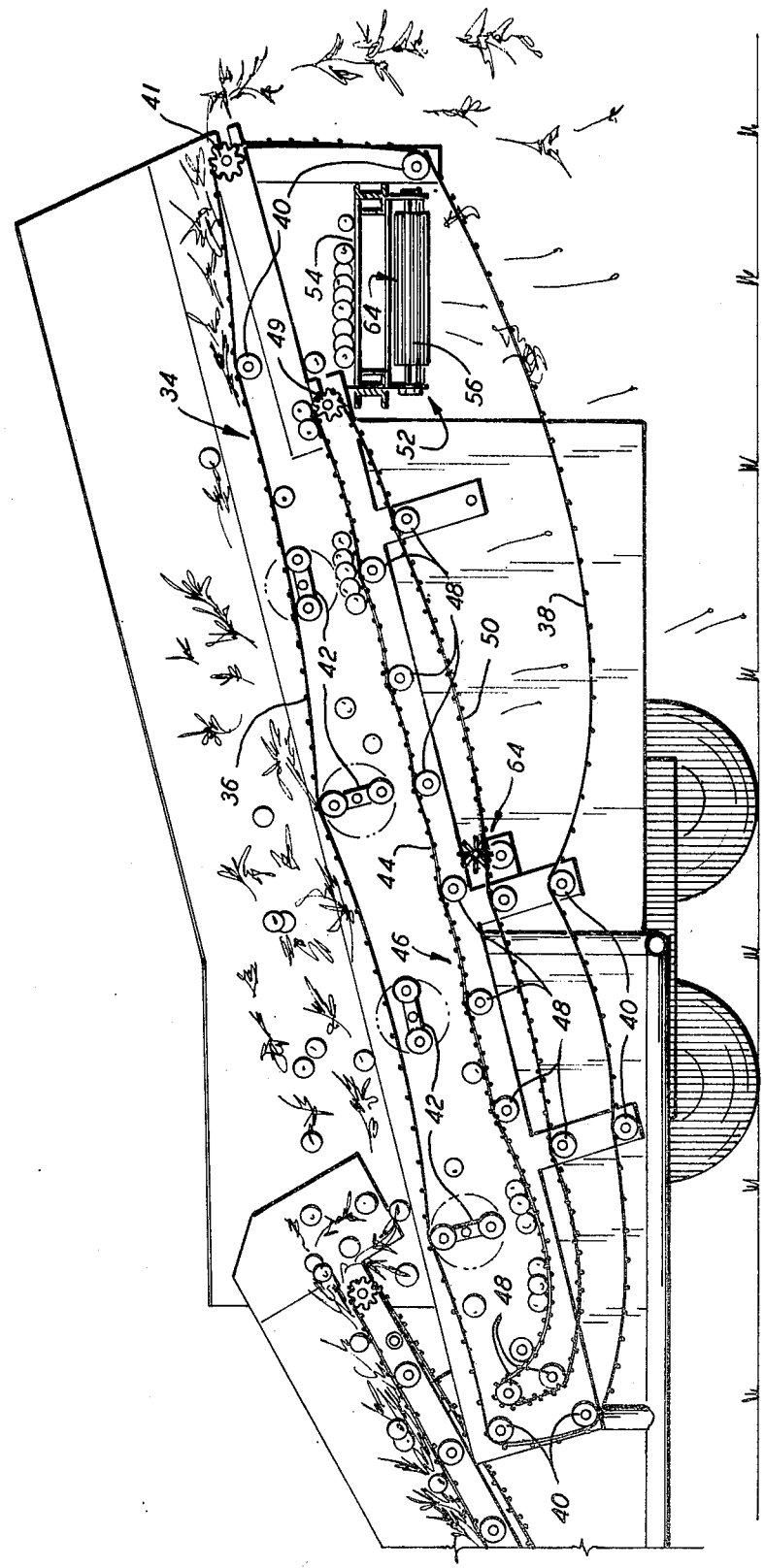
FIG. 3 is a view similar to FIG. 2 of the portion of the harvester rearward thereof, also in section generally on the line 3—3 of FIG. 1.

Referring now to FIG. 3, an oscillating, shaking action is imparted to upper run 36 of conveyor 34 by a plurality of shaker mechanisms 42, the structure and operation of which are fully explained in aforementioned U.S. Pat. No. 3,810,512. This shaking action serves to separate the fruit from the plants; the fruit drops through conveyor 34, which has links spaced more widely than the largest anticipated diameter of fruit to be harvested, while the plants are discharged at the rear of the machine.

The fruit dropping through conveyor 34 is deposited on upper run 44 of endless conveyor 46, having a path of movement defined by rollers 48 and drive sprocket 49, establishing upper run 44 and lower run 50. The links of conveyor 46 are spaced more closely than the smallest diameter of fruit to be harvested, whereby the fruit is retained upon upper reach 44 and discharged onto rear lateral conveyor 52, seen in end section in FIG. 3. Conveyor 52 likewise is composed of spaced, parallel links, attached to endless cogged belts having upper and lower runs 54 and 56, respectively, with appropriate rollers and drive sprocket (not shown).

Again referring briefly to FIG. 1, fruit from lateral conveyor 52 is discharged onto sorting belt 58 and transported forwardly of the machine as foreign materials and unwanted fruit are manually removed and discarded. From belt 58 the fruit is deposited on short, forward, lateral conveyor 60 and thence to a final discharge conveyor which may be elevated at a desired angle and includes appropriate guide rollers and drive means (not shown).

The foregoing description is a very general review of the overall construction and operation of applicant's prior art tomato harvesting machine to place the present invention in the proper context. The basic element of the cleanout system is a device which is preferably utilized in conjunction with several of the endless conveyors of the harvesting machine. Four such devices are shown in FIG. 1, each designated generally by reference numeral 64, operating in conjunction with conveyors 24, 46, 52 and 62. The links of these four conveyors are preferably all of the same pitch, i.e., spaced by the same distance, whereby devices 64 may be identical in construction.

Each device 64 is mounted for free rotation about a central axis and is mounted in the space between the upper and lower runs of the associated conveyor for operation in conjunction with the lower run. The device 64 operating in conjunction with lower run 30 of conveyor 24 is seen in FIG. 2, and those operating in conjunction with conveyors 46 and 52 are shown in FIG. 3, in addition to FIG. 1. An enlarged, sectional view of the device 64 operating in conjunction with conveyor 24 is also shown in FIG. 4.

The construction of device 64 shown in sectional end elevation in FIG. 4 is also shown in perspective in FIG. 4A. A second embodiment is shown in perspective in FIG. 4B and in sectional elevation in conjunction with a fragment of conveyor 24 in FIGS. 7-9 which will be discussed later. Device 64 is mounted for rotation about a central axis defined by short shafts 66 at each end of the device in the FIGS. 4 & 4A embodiment, and by shaft 66' which runs the full length of the device in the FIG. 4B embodiment.

A plurality of members in the form of elongated rods extending parallel to the central axis are disposed in planes extending radially from the axis. In the FIGS. 4, 4A embodiment, eight such rods 70 are arranged in planes extending radially from the central axis and spaced by 45°. Rods 70 are rigidly held in place by end portions 72 thereof which are bent to extend more or less radially with respect to the central axis and welded to shafts 66.

In the FIG. 4B embodiment, four rods 70' are supported by end portions 72' in planes spaced at 90° about the central axis established by shaft 66' which extends entirely across this embodiment of device 64. One of the principal benefits of device 64 is its ability to keep the spaces between transverse links 74 of conveyor 24 (and other conveyors in conjunction with which it is used) free of mud when operating in wet conditions, it is essential that device 64 itself not become clogged with mud. It has been found that this is best accomplished by either utilizing eight rods 70 and leaving the center open as in FIG. 4A, i.e., by using shafts 66 at the ends only, or by limiting the number of rods to four with shaft 66' extending continuously through the device as in FIG. 4B.

Although device 64 is mounted in the space between upper and lower runs 28 and 30 on conveyor 24, the central axis established by shafts 66, 66' is closer to the lower run. The distance from the central axis to equally spaced rods 70, 70' is less than the distance from the central axis to upper run 28 and greater than the distance from the central axis to lower run 30, as seen in FIG. 4. The circumferential spacing of rods 70 is so related to the pitch spacing of links 74 of conveyor 24 that advancement of lower run 30 in the direction of arrow 76 produces rotation of device 64 in the direction of arrow 78 with successive ones of rods 70 passing through the space between successive ones of links 74. The other devices 64 are similarly positioned with respect to the associated conveyors. It is preferred that devices 64 be mounted either directly between or closely adjacent a pair of the guide rollers for the associated conveyor so that the latter is supported from below to offset any downward pressure which may be exerted on the belt, particularly due to contact of rods 70 with materials which may be wedged between links 74. In this manner, the spaces between the links are kept substantially free of foreign matter.

As previously mentioned, the conveyors are preferably of the cogged-belt type. Links 74 may be of flat or (preferably) round metal bar stock and are attached at each end, e.g., by riveting, to an endless belt. Such belts are conventionally made from a fabric-reinforced rubber in a strip 75 several inches wide, formed in an endless loop and having rubber cleats or cogs 77 extending integrally from one side thereof at evenly spaced intervals. The ends of links 74 are affixed to the surface of strip 75 opposite that from which cogs 77 extend, in the spaces between successive cogs. The dimensions and spacing of cogs 77, which are on the inside surface of the endless loop, are such that the cogs are engaged and the conveyor moved by the drive sprocket. An additional advantage provided by using conveyors of this construction is that the cleanout system is aided by the high-frequency vibrations caused by cogs 77 and the ends of links 74 moving over idler wheels 26 in the upper and lower runs, respectively, of the conveyor.

Supplemental means for assisting in maintaining conveyors 24 and 52 free of foreign matter are also shown in FIG. 1. A pair of arms 80 is mounted with one arm in proximity to each of the cogged belts at the marginal edges of conveyor 24. Arms 80 provide supplemental cleaning means, constructed and arranged to impart an oscillatory, shaking action to the upper run of the associated conveyor. One of arms 80 is shown in greater detail in FIGS. 5 and 6 pivotally supported at its center upon rod 82. Each of arms 80 carries at each end a roller 86 mounted for free rotation thereon. Drive motor 88 is connected through a Pitman bearing assembly, generally denoted by reference numeral 90, to rod 92 which in turn is coupled to arm 80 by bolt 94. Thus, rotation of hydraulic motor 88 will impart rotation to arm 80 about rod 82 alternately in opposite directions, as indicated by arrow 96. The magnitude of the oscillations may be adjusted as desired by moving bolt 94 to others of openings 98 in arm 80, and the frequency may be adjusted by appropriate valve means (not shown) controlling the flow of hydraulic fluid through motor 88.

The shaking action thus imparted to conveyor 24 by arms 80, while far less than that imparted to chain 34 for separation of plants and fruit, is sufficient to assist in dislodging materials from this conveyor and maintain it in a clean condition, free of foreign matter. The cleaning system of the invention relies principally upon cleanout devices 64 operating in conjunction with one or more of the harvester conveyors, but is also assisted by the shaking action imparted to certain of the conveyors by arms 80.

Figure 7:
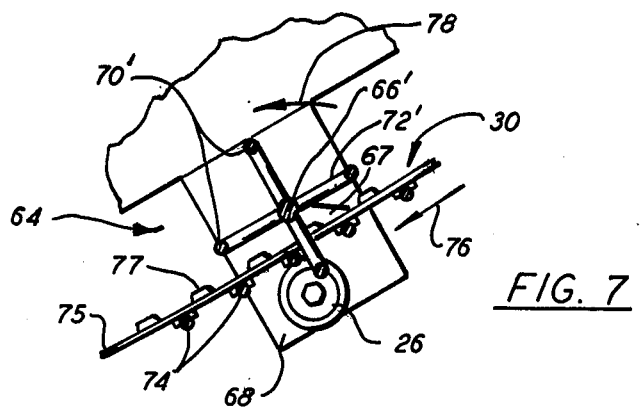
FIGS. 7, 8 and 9 are fragmentary, elevational views, similar to FIG. 4, showing the cleanout device and associated belt in three positions of relative adjustment for different types of operation.
Figure 8:
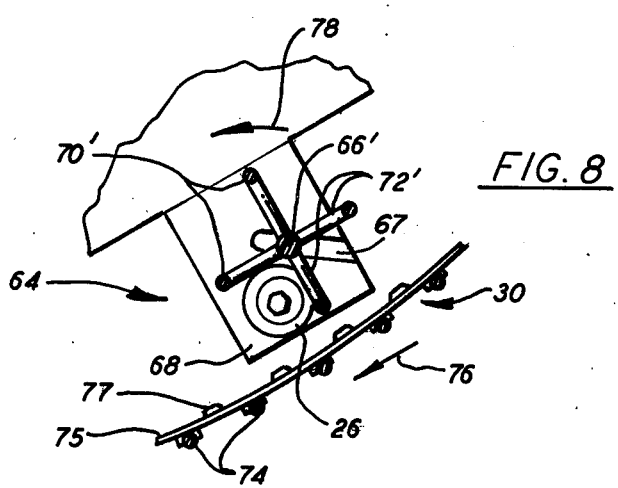
Figure 9:
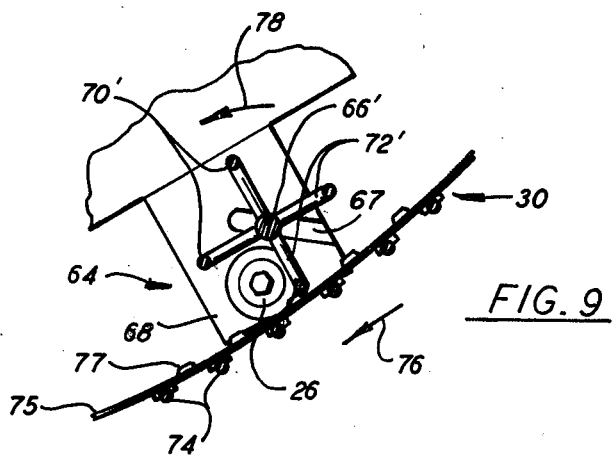

The embodiment of device 64 shown in FIG. 4B is also illustrated in FIGS. 7–9 operating in conjunction with lower reach 30 of conveyor 24. The ends of shaft 66' are mounted for adjustable positioning along slot 67 of support bracket 68. Also, the tension on the endless loop of conveyor 24 is adjustable by mounting drive sprockets 32 at each side of the conveyor on selectively movable bearing means, such as disclosed in applicant's copending application Ser. No. 731,901, now U.S. Pat. No. 4,089,421 or by other suitable means.

As illustrated in FIG. 7, device 64 is in the normal operating position for cleanout of conveyor 24. As the conveyor is advanced, device 64 is rotated thereby as rods 70' pass between links 74. With only four rods 70' the pitch spacing of links 74 is such that the rods pass between alternate link spaces, i.e., through every second space. Accordingly, by providing an odd number of links, one of rods 70' will pass through each of the spaces after two complete revolutions of the conveyor.

The use of device 64 in the normal or full cleanout position of FIG. 7 does cause some wear on the conveyor and, of course, on the device itself. Therefore, when the harvester is being operated under conditions which do not require continual cleanout of the conveyors, alternate positions may be employed. If no cleanout at all is required, lower reach 30 is positioned to go under rather than over the idler wheels 26 adjacent device 64 with sufficient slack in the conveyor to avoid any contact with rods 70', as shown in FIG. 8.

If intermittent cleanout is desired, slack is removed by appropriate positioning of the previously mentioned tension adjustment means to bring lower run 30 to the position shown in FIG. 9. In this position, lower reach 30 is spaced from the central axis of device 64 by about the same distance as rods 70'. Thus, although rods 70' will not normally pass through the spaces between links 74, the oscillation of the conveyor during operation will occasionally produce sufficient movement thereof in the direction of the cleanout device to cause one or rods 70' to pass through one of the spaces between links 74. Such intermittent, random operation is sufficient under some conditions to provide any necessary cleanout of the conveyor links without requiring continuous operation.

What is claimed is:

1. In harvesting apparatus which picks up a crop from at or below ground level for transport through the apparatus, a self-cleaning conveying system comprising:
  (a) an endless conveyor having a plurality of evenly spaced, parallel links each connected at opposite ends to a pair of continuous loop belts forming the marginal edges of said conveyor;
  (b) rigid frame means for supporting said conveyor;
  (c) a plurality of rotatable members mounted upon said frame means for supporting contact with said belts to establish a path of movement thereof which includes an upper run and a lower run;
  (d) a cleanout device including at least four rigid, elongated rods and means for supporting said rods in parallel, evenly spaced relation about a fixed central axis; and
  (e) means for mounting said cleanout device upon said frame means with said rods parallel to said links for rotation about said central axis, said mounting means supporting said cleanout device at opposite ends thereof at points on said frame means adjacent a pair of said rotatable members, coaxially mounted on opposite sides of said frame means in supporting contact with said lower conveyor run, said central axis being disposed between said upper and lower runs and spaced from said pair of rotatable members by a distance such that said rods extend through the spaces between said links as said conveyor is moved past said pair of rollers.

2. The invention according to claim 1 wherein the circumferential spacing of said rods about said central axis is substantially equal to twice the spacing between said links and the number of said links is an odd number.

3. The invention according to claim 1 wherein said rods include end portions extending outwardly from supported positions substantially at said central axis at each end of said device.

4. The invention according to claim 1 wherein said mounting means comprises a short shaft at each end of said device at said central axis and extending outwardly from the plane of the ends of said rods, the portion of said device surrounded by said rods being open and free of any structure.

* * * * *